United States Patent
Osaki et al.

(10) Patent No.: US 10,137,436 B2
(45) Date of Patent: Nov. 27, 2018

(54) HYDROGENATION CATALYST FOR HEAVY HYDROCARBON OIL AND HYDROGENATION METHOD FOR HEAVY HYDROCARBON OIL

(71) Applicant: Cosmo Oil Co., Ltd., Tokyo (JP)

(72) Inventors: Takayuki Osaki, Tokyo (JP); Nobumasa Nakajima, Satte (JP)

(73) Assignee: COSMO OIL CO., LTD., Tokyo (JP)

( * ) Notice: Subject to any disclaimer, the term of this patent is extended or adjusted under 35 U.S.C. 154(b) by 269 days.

(21) Appl. No.: 15/022,463

(22) PCT Filed: Sep. 25, 2014

(86) PCT No.: PCT/JP2014/075402
§ 371 (c)(1),
(2) Date: Mar. 16, 2016

(87) PCT Pub. No.: WO2015/046316
PCT Pub. Date: Apr. 2, 2015

(65) Prior Publication Data
US 2016/0220985 A1 Aug. 4, 2016

(30) Foreign Application Priority Data

Sep. 27, 2013 (JP) .................. 2013-201799

(51) Int. Cl.
| | | |
|---|---|---|
| *B01J 23/24* | (2006.01) | |
| *B01J 23/887* | (2006.01) | |
| *C10G 45/04* | (2006.01) | |
| *B01J 37/04* | (2006.01) | |
| *B01J 35/00* | (2006.01) | |
| *B01J 35/02* | (2006.01) | |
| *B01J 35/10* | (2006.01) | |
| *B01J 37/02* | (2006.01) | |
| *C10G 45/08* | (2006.01) | |
| *B01J 37/06* | (2006.01) | |
| *B01J 37/08* | (2006.01) | |
| *B01J 21/04* | (2006.01) | |
| *B01J 23/06* | (2006.01) | |
| *B01J 23/883* | (2006.01) | |
| *B01J 37/03* | (2006.01) | |
| *B01J 37/00* | (2006.01) | |

(52) U.S. Cl.
CPC .......... *B01J 23/8873* (2013.01); *B01J 21/04* (2013.01); *B01J 23/06* (2013.01); *B01J 23/883* (2013.01); *B01J 35/0006* (2013.01); *B01J 35/006* (2013.01); *B01J 35/023* (2013.01); *B01J 35/026* (2013.01); *B01J 35/1014* (2013.01); *B01J 35/1019* (2013.01); *B01J 35/1061* (2013.01); *B01J 37/0201* (2013.01); *B01J 37/0207* (2013.01); *B01J 37/04* (2013.01); *B01J 37/06* (2013.01); *B01J 37/08* (2013.01); *C10G 45/04* (2013.01); *C10G 45/08* (2013.01); *B01J 37/0009* (2013.01); *B01J 37/033* (2013.01); *B01J 2523/00* (2013.01); *C10G 2300/202* (2013.01); *C10G 2300/205* (2013.01); *C10G 2300/206* (2013.01)

(58) Field of Classification Search
CPC ... B01J 21/04; B01J 23/06; B01J 23/24; B01J 35/1014; B01J 35/1019; B01J 35/1061; C10G 45/04; C10G 45/08
USPC .......... 502/307, 323, 342, 355; 208/46, 136, 208/216 R, 243, 295–297
See application file for complete search history.

(56) References Cited

U.S. PATENT DOCUMENTS

| | | | |
|---|---|---|---|
| 5,686,374 A | 11/1997 | Nakaoka | |
| 2004/0050754 A1* | 3/2004 | Abe ................... | B01J 23/85 208/216 PP |
| 2004/0238411 A1* | 12/2004 | Abe ................... | B01J 23/85 208/216 PP |
| 2005/0245622 A1* | 11/2005 | Beijense ............. | B01J 23/60 518/716 |

(Continued)

FOREIGN PATENT DOCUMENTS

| | | |
|---|---|---|
| CN | 1123310 A | 5/1996 |
| CN | 1766049 A | 5/2006 |
| JP | H09248460 A | 9/1997 |
| JP | 2001314770 A | 11/2001 |
| JP | 2010248476 A | 11/2010 |

OTHER PUBLICATIONS

Office Action dated Feb. 22, 2017 in CN Application No. 201480052600.0.

(Continued)

*Primary Examiner* — Patricia L. Hailey
(74) *Attorney, Agent, or Firm* — Panitch Schwarze Belisario & Nadel LLP

(57) ABSTRACT

The hydrogenation catalyst for heavy hydrocarbon oil includes: at least one of metals in Group 6 of the periodic table being held by a zinc-containing alumina carrier containing 1% by mass to 15% by mass of zinc oxide particles having an average particle diameter of 2 μm to 12 μm based on the carrier; the average pore diameter being 18 nm to 35 nm, and the specific surface area being 70 m$^2$/g to 150 m$^2$/g. Also, the hydrogenation method for heavy hydrocarbon oil, includes, a catalytic reaction of heavy hydrocarbon oil in the presence of the hydrogenation catalyst, under the conditions of a temperature of 300° C. to 420° C., a pressure of 3 MPa to 20 MPa, a hydrogen/oil ratio of 400 m$^3$/m$^3$ to 3,000 m$^3$/m$^3$, and a liquid space velocity of 0.1 h$^{-1}$ to 3 h$^{-1}$.

2 Claims, No Drawings

(56) References Cited

U.S. PATENT DOCUMENTS

2009/0048353 A1* 2/2009 Baijense ................. B01J 23/60
                                                  518/700
2016/0220986 A1* 8/2016 Osaki ...................... B01J 27/19
2016/0228858 A1* 8/2016 Osaki ...................... B01J 27/19
2016/0230102 A1* 8/2016 Osaki ...................... B01J 27/19

OTHER PUBLICATIONS

Extended Search Report dated May 26, 2017 in EP Application No. 148479660.
International Search Report dated Nov. 11, 2014 in International Application No. PCT/JP2014/075402.

* cited by examiner

HYDROGENATION CATALYST FOR HEAVY HYDROCARBON OIL AND HYDROGENATION METHOD FOR HEAVY HYDROCARBON OIL

CROSS-REFERENCE TO RELATED APPLICATION

This application is a Section 371 of International Application No. PCT/JP2014/075402, filed Sep. 25, 2014, which was published in the Japanese language on Apr. 2, 2015, under International Publication No. WO 2015/046316 A1, and the disclosure of which is incorporated herein by reference.

TECHNICAL FIELD

The present invention relates to a hydrogenation catalyst for heavy hydrocarbon oil, and a hydrogenation method for heavy hydrocarbon oil using the hydrogenation catalyst. Particularly, the present invention relates to a hydrogenation catalyst suitable for improving the storage stability of a hydrogenated oil obtained by hydrogenating a heavy hydrocarbon oil containing sulfur, asphaltene, and heavy metals such as nickel and vanadium, and a hydrogenation method suitable for demetallization of heavy hydrocarbon oil in a first part of a catalyst bed using the hydrogenation catalyst.

Priority is claimed on Japanese Patent Application No. 2013-201799, filed Sep. 27, 2013, the content of which is incorporated herein by reference.

BACKGROUND ART

In recent years, the need for a low-sulfur heavy oil has been increasing for preventing environmental pollution problems such as acid rain. On the other hand, as crude oil has become heavy globally, there is an increasing tendency of crude oil containing large amounts of sulfur, asphaltene, heavy metals and the like needing to be treated, and the conditions for hydrogenating heavy hydrocarbon oil such as atmospheric distillation residual oil or vacuum distillation residual oil to obtain a low-sulfur heavy oil have been getting severer. The prolonged demand structure involving a shortage of middle distillates is also a background to this tendency.

As a result, improvements in activity and life of a hydrogenation catalyst have been studied intensively for the purpose of increasing production of a low-sulfur heavy oil by hydrogenating heavy hydrocarbon oil. For example, a hydrogenation catalyst is disclosed in which the catalyst average pore diameter is improved by supporting an active metal on an inorganic oxide carrier containing alumina and zinc without reducing the strength of the catalyst (for example, refer to PTL 1).

On the other hand, heavy hydrocarbon oil is required to have improved storage stability. Hydrogenated heavy hydrocarbon oil is stored under heating to maintain fluidity until shipping in consideration of workability at the time of shipping. In addition, the oil may be stored for a long period of time after the oil is shipped as a product before use. Therefore, depending on a thermal history and the atmosphere at the time of storage, sediment is produced while the oil is stored and this sediment may cause plugging of a filter or damage a pump.

There are several reasons for sediment being produced, one of which is considered to be the stability of asphaltene contained in heavy hydrocarbon oil. When asphaltene is surrounded by resin, the asphaltene is dispersed in heavy hydrocarbon oil without producing sediment. However, when resin is dissociated from asphaltene by hydrogenation and the balance between the asphaltene and the resin collapses, the asphaltene easily appears as sediment.

CITATION LIST

Patent Literature

[PTL 1] Japanese Unexamined Patent Application, First Publication No. 2001-314770

SUMMARY OF INVENTION

Technical Problem

An object of the present invention is to provide a hydrogenation catalyst capable of improving the storage stability of hydrogenated heavy hydrocarbon oil without reducing desulfurization activity or demetallization activity, and a hydrogenation method for heavy hydrocarbon oil using the hydrogenation catalyst.

Solution to Problem

The present inventors have conducted extensive investigation to accomplish the above object, and found, as a result, that in hydrogenation for heavy hydrocarbon oil, by using a hydrogenation catalyst which allows a hydrogenation-active component to be supported on a zinc-containing alumina carrier containing a specific amount of zinc particles having a specific particle size, a hydrogenated oil in which the amount of potential total sediment is reduced can be obtained and thus the present invention has been completed.

That is, the present invention relates to a hydrogenation catalyst for heavy hydrocarbon oil and a hydrogenation method for heavy hydrocarbon oil described below.

[1] A hydrogenation catalyst for heavy hydrocarbon oil in which at least one of metals in Group 6 of the periodic table is supported on a zinc-containing alumina carrier containing 1% by mass to 15% by mass of zinc oxide particles having an average particle diameter of 2 μm to 12 μm based on the carrier, the average pore diameter is 18 nm to 35 nm, and the specific surface area is 70 m$^2$/g to 150 m$^2$/g.

[2] A hydrogenation method for heavy hydrocarbon oil, comprising:

conducting a catalytic reaction of heavy hydrocarbon oil in the presence of the hydrogenation catalyst according to [1], under the conditions of a temperature of 300° C. to 420° C., a pressure of 3 MPa to 20 MPa, a hydrogen/oil ratio of 400 m$^3$/m$^3$ to 3,000 m$^3$/m$^3$, and a liquid space velocity of 0.1 h$^{-1}$ to 3 h$^{-1}$.

Advantageous Effects of Invention

Since in the hydrogenation catalyst according to the present invention, a zinc-containing alumina carrier containing a specific amount of zinc is used and the average pore diameter and the specific surface area are large, the hydrogenation catalyst has excellent desulfurization activity and demetallization activity. In addition, since the zinc-containing alumina carrier supports zinc oxide particles having a specific particle size, a heavy hydrocarbon oil that does not easily produce sediment can be obtained by carrying out hydrogenation using the hydrogenation catalyst.

DESCRIPTION OF EMBODIMENTS

In a hydrogenation catalyst according to the present invention, as a carrier, zinc-containing alumina containing 1% by mass to 15% by mass of zinc, preferably 2% by mass to 12% by mass, in terms of oxide based on the carrier, is used. In general, as the average pore diameter of the catalyst increases, the strength of the catalyst tends to decrease. However, when zinc is incorporated in the alumina carrier, the strength of the carrier can be increased. When the zinc oxide particle content in the zinc-containing alumina carrier is set to be within the above range, the strength of the catalyst is not excessively reduced and sufficiently large average pore diameter and specific surface area can be obtained.

In the present invention and the specification, the term "in terms of oxides based on the carrier" refers to a ratio of an oxide mass to the total mass obtained by calculating the total mass of all elements included in the carrier in terms of respective oxides. The zinc oxide mass is obtained in terms of zinc oxide.

The zinc-containing alumina carrier in the hydrogenation catalyst according to the present invention contains zinc oxide particles having an average particle diameter of 2 μm to 12 μm, preferably 4 μm to 10 μm, and more preferably 5 μm to 9 μm.

When the average particle diameter of the zinc oxide particles contained in the carrier is 12 μm or less, a sufficient interaction with alumina is achieved and a hydrogenated heavy hydrocarbon oil having sufficient storage stability can be obtained. On the other hand, when the average particle diameter of the zinc oxide particles contained in the carrier is 2 μm or more, zinc is easily mixed with alumina at the time of production of a phosphorus-zinc-containing alumina carrier.

In the present invention and the specification, the particle diameter of the zinc oxide particles is measured by a laser diffraction and scattering method according to JIS R1629 and the volume average of the particle size distribution is set to the average particle diameter. In addition, as the zinc oxide particles contained in the zinc-containing alumina carrier, a zinc oxide having a purity of 99% or higher is preferable.

In the hydrogenation catalyst according to the present invention, at least one of metals in Group 6 of the periodic table (hereinafter, also referred to as "Group 6 metal") is supported on the zinc-containing alumina carrier. Examples of the Group 6 metal include molybdenum (Mo) and tungsten (W), and particularly, Mo is preferable. In the catalyst, the Group 6 metal may be present in the form of an elemental metal or may be present in the form of a metal compound such as a metal sulfide. The Group 6 metals may be used alone or in combination of two or more.

The hydrogenation catalyst according to the present invention may support other hydrogenation-active metals as a second metal component. For the other hydrogenation-active metals as the second metal component, metals in Groups 8 to 10 of the periodic table (hereinafter, also referred to as "Group 8 to 10 metals") such as nickel (Ni), cobalt (Co), and iron (Fe) are preferable. The hydrogenation-active metals supported as the second metal component may be used alone or in combination of two or more. As specific combination examples of the metal components that the zinc-containing alumina carrier in the hydrogenation catalyst according to the present invention supports, there are various combinations of Mo—Ni, Mo—Co, W—Ni, and the like. A Mo—Ni combination is suitable.

In the present invention, the term "metals in Group 6 of the periodic table" refers to the Group 6 metals in the long-periodic table and the term "metals in Groups 8 to 10 in the periodic table" refers to the Groups 8 to 10 metals in the long-periodic table.

The amount of the Group 6 metal supported on the zinc-containing alumina carrier is not particularly limited. In the case in which the metal is not used together with a second metal component, (hereinafter, the case in which the metal is used alone), the amount of the Group 6 metal supported on the zinc-containing alumina carrier is 2% by mass to 15% by mass and preferably 4% by mass to 12% by mass in terms of oxide based on the catalyst. In the case in which the metal is used together with the second metal component (hereinafter, the case in which the metal is used in combination with the second metal component), the amount of the metal is 2% by mass to 15% by mass and preferably 5% by mass to 10% by mass in terms of oxides based on the catalyst. The amount of other hydrogenation-active metals as the second metal component supported may be appropriately selected. In the amount of the Group 6 metal supported, the amount of other hydrogenation-active metals is 0.001% by mass to 5% by mass and preferably 1% by mass to 4% by mass in terms of oxides based on the catalyst.

When the amount of the second metal component supported increases, hydrogenation activity, particularly, demetallization activity increases, but the catalyst life tends to decrease. When the amount of the second metal component decreases, sufficient hydrogenation activity, particularly, demetallization activity is not easily obtained.

The average pore diameter of the hydrogenation catalyst according to the present invention is 18 nm to 35 nm, preferably 18 nm to 30 nm, and more preferably 20 nm to 30 nm. When the average pore diameter is 18 nm or more, sufficient demetallization activity is obtained and when the average pore diameter is 35 nm or less, sufficient hydrogenation activity is obtained.

The specific surface area of the hydrogenation catalyst according to the present invention is 70 $m^2/g$ to 150 $m^2/g$ and preferably 90 $m^2/g$ to 140 $m^2/g$. When the specific surface area is 70 $m^2/g$ or more, sufficient hydrogenation activity is obtained and when the specific surface area is 150 $m^2/g$ or less, a preferable average pore diameter is obtained. Thus, sufficient demetallization activity is obtained.

As a suitable method for producing the hydrogenation catalyst according to the present invention, a method including the following steps may be used.

First, an aqueous solution including a raw material for alumina is gelated and the resulting gel undergoes heating and aging and then is treated with an aqueous acid solution. The gel is washed to remove impurities and the water content is adjusted to obtain an alumina gel. Next, the alumina gel is mixed with zinc oxide particles. Next, the mixture is treated in a usual manner such as by molding, drying, and calcining to prepare a zinc-containing alumina carrier. The Group 6 metal is supported on the zinc-containing alumina carrier as required, and other active metals are further supported on the zinc-containing alumina carrier, to thereby prepare a hydrogenation catalyst.

The raw materials for alumina are not particularly limited as long as the materials contain aluminum. Examples thereof include aluminum salts, such as aluminum sulfate and aluminum nitrate. These raw materials for alumina are usually used as an aqueous solution. Although the concentration is not particularly limited, the concentration is preferably 2% by mass to 50% by mass and more preferably 5% by mass to 40% by mass.

As a method for preparing the alumina gel, a method of neutralizing an aqueous solution containing the raw material for alumina with a neutralizing agent such as a base such as ammonia, aluminic acid, sodium aluminate, or the like, a method of mixing an aqueous solution containing the raw material for alumina with a precipitating agent, such as hexamethylenetetramine, or calcium carbonate, and the like may be used. Although not particularly limited, the amount of the neutralizing agent used is preferably 30% by mass to 70% by mass with respect to the total amount of the aqueous solution containing the raw material for alumina and the neutralizing agent. Although not particularly limited, the amount of the precipitating agent is preferably 30% by mass to 70% by mass with respect to the total amount of the aqueous solution containing the raw material for alumina and the precipitating agent.

In order to obtain a hydrogenation catalyst having a desired average pore diameter, it is preferable that the pH, the temperature, and the like be adjusted while the neutralizing agent or precipitating agent is added for the gelation. Specifically, when the pH and the temperature are respectively appropriately adjusted in a pH range of 4 to 8 and a temperature range of 30° C. to 90° C., the average pore diameter of the hydrogenation catalyst can be adjusted to a desired value in the range of the present invention. In particular, the increase of the pH to an alkaline region during gel formation leads to preparation of a catalyst having a large average pore diameter.

The average pore diameter can be also adjusted with aging under heating. Aging is preferably conducted for 5 hours or longer. The longer the aging time is, the larger the average pore diameter is and the narrower the pore distribution is. The aging temperature is preferably 80° C. to 95° C. A higher aging temperature makes the aging time shorter, but too high a temperature results in denaturation of the alumina gel. The pH during the aging is preferably 9 to 12. When the pH is 9 or more, the aging proceeds rapidly. When the pH is 12 or less, alumina is less likely to undergo denaturation.

In order to suppress aging-induced denaturation of the alumina gel, after the aging under heating, the alumina gel is treated with an aqueous acid solution as described above. The aqueous acid solution which can be used here includes nitric acid, hydrochloric acid, and sulfuric acid. Nitric acid is preferable. The pH of the aqueous acid solution is 1 to 5.5 and preferably 2 to 4. When the pH is 1 or more, the crystal structure of alumina is not easily destroyed by the acid. When the pH is 5.5 or less, it does not take time for aging to cease. As one of preferable modes for carrying out the treatment with an aqueous acid solution, an aqueous nitric acid solution is added to the alumina gel to adjust the pH to 2 to 3, and the mixture is stirred thoroughly at 15° C. to 60° C. to complete aging.

After completion of the treatment with an aqueous acid solution, an aqueous alkali solution is added to the alumina gel to adjust the pH to 9 to 13, preferably 10 to 12. An aqueous ammonia solution is preferable as the aqueous alkali solution. Next, the alumina gel having a pH adjusted with the aqueous alkali solution is filtered or dried to adjust the water content of the resulting alumina gel. The water content can be adjusted by addition of water, in addition to filtration or drying. The water content is adjusted in order to facilitate molding into a catalyst. The water content after the water content adjustment is preferably 60% by mass to 95% by mass.

The microfine surface structure of alumina can be adjusted by altering the temperature and method of drying for water content adjustment. For producing the hydrogenation catalyst according to the present invention, the drying temperature for water content adjustment is preferably lower than 100° C., and particularly, a method in which the alumina gel is dried through sufficient filtration with minimum heat applied to obtain a hydrogenation catalyst is preferable. Through this method, demetallization performance can be enhanced.

Next, the alumina gel with an adjusted water content is mixed with zinc oxide particles such that the zinc oxide particle content is 1% by mass to 15% by mass in terms of oxide based on the finished catalyst. Then, the obtained mixture of the alumina gel and the zinc oxide particles is molded. Molding can be conducted by various molding methods such as extrusion and press molding.

The molded zinc-containing alumina carrier is subjected to drying and calcination. At this time, the drying temperature is preferably 15° C. to 150° C. and particularly preferably 100° C. to 120° C. The drying time is preferably 2 hours or longer and particularly preferably 3 hours to 11 hours. The calcination temperature is preferably 600° C. or higher and particularly preferably 700° C. to 900° C. The calcination time is preferably 30 minutes or longer and particularly preferably 1 hour to 4 hours. By setting the calcination temperature to 600° C. or higher, binding between the added zinc and alumina occurs and a characteristic peak derived from zinc aluminate appears at $2\theta=55.5°$ in a powder X-ray pattern. It is considered that when the characteristic peak appears, even when the catalyst pore diameter is large, a reduction in the strength of the catalyst can be suppressed. The X-ray diffraction pattern of the zinc-containing alumina carrier is maintained as it is even after an active component is supported on the carrier, that is, the hydrogenation catalyst according to the present invention is produced.

As a method for supporting the Group 6 metal and other hydrogenation-active metals as the second metal component on the zinc-containing alumina carrier prepared as described above, a known method such as an impregnation method or a coprecipitation method may be used. For example, like a method in which in a state in which the zinc-containing alumina carrier is immersed in a solution containing these hydrogenation-active metal components, the hydrogenation-active metal components are precipitated, a method in which the zinc-containing alumina carrier is brought into contact with a solution containing the hydrogenation-active metal components and the hydrogenation-active metals are supported on the zinc-containing alumina carrier can be adopted. When plural hydrogenation-active metals are supported on the carrier, these plural hydrogenation-active metals may be supported at one time or one at a time in any order.

The zinc-containing alumina carrier on which the hydrogenation-active metals are supported as described above is dried and calcined to obtain the hydrogenation catalyst according to the present invention. At this time, the drying temperature and the drying time are the same as the drying temperature and the drying time of the zinc-containing alumina carrier. The drying temperature is preferably 15° C. to 150° C. and particularly preferably 100° C. to 120° C. The drying time is preferably 2 hours or longer and particularly preferably 3 hours to 12 hours. The calcination temperature is preferably 350° C. to 800° C. and particularly preferably 400° C. to 700° C. The calcination time is preferably 1 hour or longer and particularly preferably 3 hour to 12 hours.

The hydrogenation catalyst according to the present invention is not particularly limited by shape and can have various shapes of general catalysts. As the shape of the hydrogenation catalyst according to the present invention, a three-lobe or four-lobe shape is preferable. The diameter of the catalyst is preferably about 1.1 mm to 2.5 mm.

When the hydrogenation catalyst according to the present invention is used in an actual process, a known catalyst may be used in a mixture with a known inorganic oxide carrier.

It is preferable that the hydrogenation catalyst according to the present invention be subjected to preliminary sulfurization before use in hydrogenation for heavy hydrocarbon oil. As a method for the preliminary sulfurization, for example, a method of supplying hydrocarbon oil or a gaseous sulfide containing 1% by mass or more of sulfur onto the catalyst under high temperature and high pressure can be adopted. By carrying out this preliminary sulfurization, the hydrogenation-active metal components become sulfides for the most part. A part or the whole of the hydrogenation-active metal components is also converted to sulfides by the sulfur of the heavy hydrocarbon oil during hydrogenation.

The above-mentioned hydrogenation catalyst according to the present invention can be used as a catalyst suitable for effectively removing heavy metals from a heavy hydrocarbon oil containing sulfur, asphaltene, and heavy metals such as nickel and vanadium. That is, the hydrogenation catalyst according to the present invention is a catalyst suitable for producing a low-sulfur heavy oil, which becomes a middle distillate or a product as it is, from heavy hydrocarbon oil. Therefore, for example, when heavy hydrocarbon oil is hydrogenated in multiple stages, the hydrogenation catalyst according to the present invention can be particularly suitably used as a demetallization catalyst in the first part of the catalyst bed.

A hydrogenation method for heavy hydrocarbon oil of the present invention is carried out using the hydrogenation catalyst according to the present invention. Particularly, the hydrogenation method is preferably carried out as a method for producing a low-sulfur heavy oil, which becomes a middle distillate or a product as it is, from heavy hydrocarbon oil, or a method for demetallizing the first part of the catalyst bed in a multi-stage hydrogenation method for heavy hydrocarbon oil.

Examples of the heavy hydrocarbon oils used in the hydrogenation method according to the present invention include visbreaking oil which includes atmospheric distillation residual oil, vacuum distillation residual oil, and thermally cracked oil, each obtained from crude oil by distillation, tar sand oil and shale oil which are heavy hydrocarbon oils other than petroleum, and mixtures thereof. Atmospheric distillation residual oil, vacuum distillation residual oil, or a mixture thereof is preferable.

In the case of mixing atmospheric distillation residual oil and vacuum distillation residual oil, although the mixing ratio varies depending on the properties thereof, the oils are mixed such that the mixing ratio of the vacuum distillation residual oil is about 1% by volume to 60% by volume in most cases.

As the heavy hydrocarbon oil used in the hydrogenation method according to the present invention, a heavy hydrocarbon oil having a density of 0.91 g/cm$^3$ to 1.10 g/cm$^3$, and particularly 0.95 g/cm$^3$ to 1.05 g/cm$^3$; 2% by mass to 6% by mass, and particularly 2% by mass to 5% by mass of sulfur; 1 ppm to 1,500 ppm, and particularly 20 ppm to 400 ppm of metals such as nickel and vanadium; and 2% by mass to 15% by mass, and particularly 3% by mass to 10% by mass of asphaltene is preferable.

The hydrogenation for heavy hydrocarbon oil in the present invention refers to a treatment of heavy hydrocarbon oil being brought into contact with hydrogen and includes hydrofining under relatively less severe reaction conditions, hydrofining under relatively severe reaction conditions accompanying slight cracking, hydrosulfide isomerization, hydrodealkylation, demetallization, and other reactions of heavy hydrocarbon oil in the presence of hydrogen. Particularly, a formation reaction of a low-sulfur heavy oil as a middle distillate or the like, and a demetallization reaction in the first part of the catalyst bed in a multi-stage hydrogenation method for heavy hydrocarbon oil are preferable. Examples include hydrodesulfurization, hydrodenitrogenation, and hydrocracking of a residual oil resulting from atmospheric distillation or a distillate or residual oil resulting from vacuum distillation, and hydrofining of waxes or lubricant fractions.

The hydrogenation conditions in the hydrogenation method according to the present invention are such that the temperature is 300° C. to 420° C. and preferably 350° C. to 410° C., the pressure (partial pressure of hydrogen) is 3 MPa to 20 MPa and preferably 8 MPa to 19 MPa, a hydrogen/oil ratio is 400 m$^3$/m$^3$ to 3,000 m$^3$/m$^3$ and preferably 500 m$^3$/m$^3$ to 1,800 m$^3$/m$^3$, and a liquid space velocity (LHSV) is 0.1 h$^{-1}$ to 3 h$^{-1}$ and preferably 0.15 h$^{-1}$ to 2 h$^{-1}$. The conditions may be appropriately selected within the above ranges according to a required degree of reaction.

When the temperature is 300° C. or higher, catalytic activity, particularly demetallization activity is sufficiently exhibited. When the temperature is 420° C. or lower, thermal cracking of the heavy hydrocarbon oil does not excessively proceed and thus catalyst degradation is suppressed.

When the hydrogen pressure is 3 MPa or more, a hydrogenation reaction easily proceeds and when the hydrogen pressure is 20 MPa or less, demetallization activity is appropriately improved and the catalyst life is extended.

When the hydrogen/oil ratio is 400 m$^3$/m$^3$ or more, hydrogenation activity is improved and when the hydrogen/oil ratio is 3,000 m$^3$/m$^3$ or less, excellent economical efficiency is obtained.

When the liquid space velocity is 0.1 h$^{-1}$ or more, excellent economical efficiency is obtained and when the liquid space velocity is 3 h$^{-1}$ or less, catalytic activity is improved.

In the case in which the hydrogenation method according to the present invention is carried out on a commercial scale, in an appropriate reactor, the hydrogenation catalyst according to the present invention is used as a fixed bed, moving bed or fluidized bed catalyst layer, and a heavy hydrocarbon oil to be treated is introduced to the reactor and treated. In general, the hydrogenation catalyst according to the present invention is maintained in a fixed bed and heavy hydrocarbon oil is made to flow down through the fixed bed. The hydrogenation catalyst according to the present invention may be used either in a single reactor or several reactors connected in series. It is particularly preferable to use a multi-stage reactor. As described above, the hydrogenation catalyst according to the present invention is suitable for demetallization of heavy hydrocarbon oil as a pre-treatment and irrespective of a case of using a single reactor, several reactors connected in series, or a multi-stage reactor, it is preferable that these reactors be used by being positioned in the first portion of the catalyst bed in multi-stage hydrogenation of the heavy hydrocarbon oil.

EXAMPLES

Next, embodiments and effects of the present invention will be described more specifically by way of examples and the like, but the present invention is not construed as being limited by these examples.

The average particle diameters of the zinc oxide particles used in Examples and Comparative Examples are shown in Table 1. The particle diameter of the zinc oxide particles was measured by the laser diffraction and scattering method according to JIS R1629 and the volume average of the particle size distribution was set as the average particle diameter.

TABLE 1

|  | Average particle diameter (μm) |
|---|---|
| Zinc oxide 1 | 5.5 |
| Zinc oxide 2 | 7.1 |
| Zinc oxide 3 | 0.5 |
| Zinc oxide 4 | 15.0 |

[Example 1] Preparation of Hydrogenation Catalyst A 10 kg of a 5% by mass aqueous sodium aluminate solution was heated to 60° C., and 2.8 kg of a 25% by mass aqueous aluminum sulfate solution was gently added thereto so as to adjust the pH of a solution to be finally obtained to 7. At this time, the temperature of the solution was maintained at 60° C. The alumina slurry thus formed was filtered and the alumina gel separated by filtration was repeatedly washed with a 0.3% by mass aqueous ammonia solution.

Next, 5 kg of water was added to the washed alumina gel and a 10% by mass aqueous ammonia solution was further added to the aqueous dispersion of the alumina gel. The pH of the aqueous dispersion of the alumina gel was adjusted to 11. The aqueous dispersion of the gel was heated to 90° C. and refluxed while stirring for aging for 40 hours.

Then, the pH of the aqueous dispersion of the gel was adjusted to 2 by adding a 5 N aqueous nitric acid solution, followed by stirring for 15 minutes. Further, the pH of the aqueous dispersion of the gel was adjusted to 11 by adding a 10% by mass aqueous ammonia solution. The obtained aqueous dispersion of the gel was filtered and then water was added to the filtered alumina gel at 25° C. to adjust the water content to give a viscosity practical for molding. The water content of the alumina gel after the water content adjustment was 70% by mass.

Subsequently, Zinc oxide 1 as zinc oxide particles was added to the alumina gel in an amount of 7.8% by mass based on the carrier followed by fully and homogeneously mixing with a kneader. The obtained zinc-containing alumina gel was extrusion molded, dried at 110° C. for 10 hours, and calcined at 800° C. for 2 hours.

100 g of the calcined zinc-containing alumina carrier was impregnated with a solution consisting of 100 g of water having dissolved therein antimony paramolybdate and nickel nitrate in concentrations of 9% by mass of Mo and 2% by mass of Ni, respectively, in terms of oxides. The impregnated zinc-containing alumina carrier was heated at 110° C. for 4 hours to dry the solution and then calcined at 550° C. for 3 hours to prepare Hydrogenation catalyst A.

The zinc content of Hydrogenation catalyst A was 7.8% by mass in terms of oxide based on the carrier and as the hydrogenation-active metal contents, the Mo content was 9% by mass and the Ni content was 2% by mass in terms of oxides, based on the catalyst. Hydrogenation catalyst A had a four-lobe shape having a diameter of 1.3 mm.

[Example 2] Preparation of Hydrogenation Catalyst B

Hydrogenation catalyst B was prepared in the same manner as in Example 1 except that Zinc oxide 1 was changed to Zinc oxide 2.

[Comparative Example 1] Preparation of Hydrogenation Catalyst a

Hydrogenation catalyst a was prepared in the same manner as in Example 1 except that Zinc oxide 1 was changed to Zinc oxide 3.

[Comparative Example 2] Preparation of Hydrogenation Catalyst b

Hydrogenation catalyst b was prepared in the same manner as in Example 1 except that Zinc oxide 1 was changed to Zinc oxide 4.

<Physical Properties and Chemical Properties of Catalyst>

The properties of Hydrogenation catalysts A, B, a, and b [the amounts of Mo and Ni supported (in terms of oxides based on the catalyst), the amount of zinc (in terms of oxide based on the carrier), the average pore diameter, and the specific surface area] prepared in Examples 1 and 2, and Comparative Examples 1 and 2 are shown in Table 2. In Table 2, "Ni/Mo (upper row) 2/9 (lower row)" in the column "active metals/amount of active metals (% by mass)" means that the catalyst contains 2% by mass of Ni and 9% by mass of Mo in terms of oxides based on the catalyst. The physical properties and chemical properties of the catalysts were measured in the following procedures.

[1] Determination of Physical Properties (Specific Surface Area and Average Pore Diameter)

a) Measurement Method and Apparatus Used:

The specific surface area was measured by nitrogen adsorption according to the BET method. As the nitrogen adsorption apparatus, a surface area measuring apparatus (Belsorp Mini) manufactured by BEL Japan, Inc. was used.

The average pore diameter was measured by a mercury penetration method. As the mercury penetration apparatus, a porosimeter (MICROMERITICS AUTOPORE 9200, manufactured by Shimadzu Corporation) was used.

b) Measurement Principle:

The mercury penetration method is based on the capillary phenomenon. In the case of mercury and cylindrical pores, the phenomenon is expressed by the following equation. In the equation, D represents a pore diameter, P represents an applied pressure, γ represents a surface tension, and θ represents a contact angle. The volume of the mercury caused to penetrate into the pores was measured as the function of the applied pressure P. The surface tension of the mercury in the pores of the catalyst was set to 484 dyne/cm and the contact angle was set to 130 degrees.

$$D = -(1/P)4\gamma \cos\theta \qquad \text{Equation:}$$

The average pore diameter is an average value of D calculated as a function of P.

c) Measurement Procedures:

1) The power of a vacuum heating degassing apparatus was turned on and it was confirmed that the temperature was set to 400° C. and the degree of vacuum was set to $5 \times 10^{-2}$ Torr or less.

2) An empty sample burette was attached to the vacuum heating degassing apparatus.

3) When the degree of vacuum reached $5 \times 10^{-2}$ Torr or less, the sample burette was closed using the cock and detached from the vacuum heating degassing apparatus, followed by being cooled to allow the weight to be measured.

4) A sample (catalyst) was put into the sample burette.

5) The sample burette into which the sample was put was attached to the vacuum heating degassing apparatus and was left for 1 hour or longer from when the degree of vacuum reached $5 \times 10^{-2}$ Torr or less.

6) The sample burette into which the sample was put was detached from the vacuum heating degassing apparatus and cooled and the weight was measured to obtain the weight of the sample.

7) The sample was put in a cell for the AUTO-PORE 9200.

8) Measurement was carried out by the AUTO-PORE 9200.

[2] Determination of Chemical Properties a) Determination Method and Used Apparatus:

Metal analysis of the catalyst was carried out using an inductive coupling plasma emission spectrometer (ICPS-2000, manufactured by Shimadzu Corporation).

Metal quantitation was carried out by an absolute calibration curve method.

b) Measurement Procedures:

1) 0.05 g of a catalyst, 1 mL of hydrochloric acid (50% by mass), a drop of hydrofluoric acid, and 1 mL of purified water were charged into a uniseal, followed by heating for decomposition.

2) After the decomposition, the obtained solution was moved to a measuring flask made of polypropylene (having a volume of 50 mL), purified water was added to the flask, and 50 mL of the solution was weighed.

3) The measurement for the solution was carried out using the ICPS-2000.

TABLE 2

|  | Example 1 | Example 2 | Comparative Example 1 | Comparative Example 2 |
|---|---|---|---|---|
| Type of catalyst | Catalyst A | Catalyst B | Catalyst a | Catalyst b |
| Zinc oxide | Zinc oxide 1 | Zinc oxide 2 | Zinc oxide 3 | Zinc oxide 4 |
| Active metals | Ni/Mo | Ni/Mo | Ni/Mo | Ni/Mo |
| Amount of active metals (% by mass) | 2/9 | 2/9 | 2/9 | 2/9 |
| ZnO (% by mass) | 7.8 | 7.8 | 7.9 | 7.8 |
| Average pore diameter (nm) | 20.5 | 20.6 | 20.1 | 20.2 |
| Specific surface area (m²/g) | 125 | 129 | 130 | 123 |

<Hydrogenation Reaction of Heavy Hydrocarbon Oil>

Hydrogenation for vacuum distillation residual oil (VR) having the following properties was carried out by the following procedures. As the hydrogenation catalysts, catalysts A, B, a, and b prepared in Examples 1 and 2, and Comparative Examples 1 and 2 were respectively used.

First, the hydrogenation catalyst was charged into a high-pressure flow type reactor to form a fixed bed type catalyst layer, and then a pre-treatment was carried out under the following conditions. Next, a fluid mixture of a feedstock oil heated to the reaction temperature and a hydrogen-containing gas was introduced from the upper part of the reactor. A desulfurization reaction and a hydrogenation reaction, which is a decomposition reaction, were carried out under the following conditions to produce an oil. A fluid mixture of the product oil and gas was allowed to flow out from the lower part of the reactor and the product oil was separated out by a gas-liquid separator.

The measurement methods were such that the density was measured according to JIS K 2249-1 "Crude petroleum and petroleum products-Determination of density and petroleum measurement tables (oscillation type density testing method)", the sulfur content was measured according to JIS K 2541-4 "Crude oil and petroleum products-Determination of sulfur content, Part 4: Energy-dispersive X-ray fluorescence method", and the potential total sediment content was measured according to JPI-5S-60-2000. Specifically, the potential total sediment content was determined in the following manner.

<Measurement Procedure of Potential Total Sediment Content>

1) 25 g of a sample heated to 60° C. was collected and put into an Erlenmeyer flask, an air condenser was attached to the flask, and the flask was put in an oil bath at 100° C. and held for 24 hours.

2) The sample was sufficiently oscillated and then 10.5 g of the sample was sampled and put into a glass beaker.

3) The glass beaker into which the sample was put was heated at 100° C. for 10 minutes.

4) The sample was charged into a vacuum filter in which 3 sheets of dried glass fiber filter paper (having a diameter of 47 mm and a pore diameter of 1.6 μm) were set in a laminated manner and the pressure was reduced to 80 kPa with a vacuum pump and the pressure was reduced to 40 kPa after 30 seconds.

5) After the filtration was completed and the filter paper surface was dried, the pressure was further reduced continuously for 5 minutes.

6) After the vacuum pump was stopped, the funnel and the entire filter were washed with 25 mL of a cleaning solvent (heptane 85 mL+toluene 15 mL) while drawing up the filter with an aspirator.

7) After the filter paper was further washed with 20 mL of heptane, the uppermost filter paper (the first sheet from the above) was removed and the filter paper underneath was washed with 20 mL of heptane.

8) The first and second filter paper from the top were dried at 110° C. for 20 minutes and then allowed to cool for 30 minutes.

9) The amount of an increase in the weight of the first and second filter paper obtained by comparing the weight after filtration and the weight before filtration was measured, the weight obtained by subtracting the increased weight of the second filter paper from the increased weight of the first filter paper with respect to the weight of the collected sample was expressed as a percentage, and the value was set to the potential total sediment (% by mass).

When the filtration was not finished in 25 minutes, the amount of the sample was reduced to 5 g or 2 g and the measurement was carried out again.

The nickel and vanadium contents were measured according to the Japan Petroleum Institute standard JPI-5S-62-

2000 "Petroleum products-Determination of metal content (ICP emission spectrometry)".

For asphaltene, toluene was added to the sample and the mixture was then filtered with a cellulose filter to recover toluene-insoluble components. These insoluble components were considered as asphaltene.

For resins, toluene was added to the sample and then the mixture was filtered with a cellulose filter. Then, the toluene soluble components as a filtrate were concentrated. A heptane solution obtained by adding heptane to the concentrate was made to flow through an active alumina-charged column and separated into saturates, aromatics, and resins to recover the resins.

Pre-Treatment Conditions for Catalyst:

Preliminary sulfurization of the catalyst was carried out with a vacuum gas oil at a hydrogen partial pressure of 10.3 MPa and 370° C. for 12 hours. Then, the gas oil was changed to a feedstock oil for activity evaluation.

Reaction Conditions

Reaction temperature: 385° C.

Pressure (hydrogen partial pressure): 10.3 MPa

Liquid space velocity: 0.4 $h^{-1}$

Hydrogen/oil ratio: 1,690 $m^3/m^3$

Properties of Feedstock Oil

Type of oil: vacuum distillate residual oil of Middle East type crude oil

Density (at 15° C.): 1.037 $g/cm^3$

Sulfur component: 4.27% by mass

Vanadium: 91 ppm

Nickel: 54 ppm

Asphaltene content: 7.8% by mass

The catalytic activity was determined in the following manner. The reactor was operated at 385° C. and an oil produced after 20 days had passed from when the operation started was collected. Thus, the properties (degree of desulfurization (HDS) (%), desulfurization reaction rate constant (Ks), desulfurization specific activity (%), and degree of demetallization (HDM)) of the oil were determined. The results are shown in Table 3.

[1] Degree of desulfurization (HDS) (%): The proportion of sulfur content which has disappeared from the feedstock oil through conversion of sulfur content in the feedstock into hydrogen sulfide by desulfurization reaction is defined as the degree of desulfurization. The degree of desulfurization was calculated from the analytical values of sulfur content for the feedstock oil and product oil using Equation (1) below.

[2] Desulfurization reaction rate constant (Ks): The constant of a reaction rate equation which gives a second order reaction with respect to a decrease in sulfur content of the product oil (Sp) is defined as the desulfurization reaction rate constant (Ks). The desulfurization reaction rate constant was calculated by Equation (2) below. Also, the higher the reaction rate constant is, the more excellent the catalytic activity is.

[3] Desulfurization specific activity (%): The desulfurization specific activity is expressed as a relative value when the desulfurization reaction rate constant of Catalyst A is 100. The desulfurization specific activity was calculated by Equation (3) below.

[4] Degree of demetallization (HDM) (%): The proportion of metal content (total amount of nickel and vanadium) which has disappeared from the feedstock oil is defined as the degree of demetallization and the degree of desulfurization was calculated from the analytical values of metal content for the feedstock oil and product oil using Equation (4) below.

$$\text{Degree of desulfurization (\%)} = [(Sf-Sp)/Sf] \times 100 \quad (1)$$

$$\text{Desulfurization reaction rate constant} = [1/Sp - 1/Sf] \times (LHSV) \quad (2)$$

In the formulae, Sf: sulfur content in feedstock oil (% by mass),

Sp: sulfur content in product oil (% by mass), and

LHSV: liquid space velocity ($h^{-1}$).

$$\text{Desulfurization specific activity (\%)} = (\text{desulfurization reaction rate constant of each catalyst/desulfurization reaction rate constant of Catalyst } A) \times 100 \quad (3)$$

$$\text{Degree of demetallization (\%)} = [(Mf-Mp)/Mf] \times 100 \quad (4)$$

In the formulae, Mf: total amount of nickel and vanadium in feedstock oil (ppm by mass), and Mp: total amount of nickel and vanadium in product oil (ppm by mass).

[Analysis on Product Oil]

The results of the desulfurization specific activity, degree of demetallization, resin content, asphaltene content, ratio of asphaltene content to resin content (mass ratio, [asphaltene content (% by mass)/[resin content (% by mass)]), and potential total sediment content obtained from a product oil produced from the hydrogenation reaction on the 20th operation day are shown in Table 3.

TABLE 3

|  | Example | | Comparative Example 1 | Comparative Example 2 |
|---|---|---|---|---|
|  | Example 1 | Example 2 | | |
| Type of catalyst | Catalyst A | Catalyst B | Catalyst a | Catalyst b |
| Desulfurization specific activity (Catalyst A = 100) | 100 | 103 | 99 | 97 |
| Degree of demetallization (%) | 91 | 91 | 90 | 89 |
| Resin content (% by mass) | 7.9 | 8.0 | 5.2 | 5.4 |
| Asphaltene content (% by mass) | 2.7 | 2.7 | 2.6 | 2.6 |
| Asphaltene content/resin content (mass ratio) | 0.34 | 0.34 | 0.50 | 0.48 |
| Potential total sediment (% by mass) | 0.3 | 0.3 | 0.5 | 0.5 |

The result was that in all the catalysts, the desulfurization specific activity and the degree of demetallization were almost the same. On the other hand, regarding the resin content and the amount of potential total sediment in the product oil, in the case of using Catalyst A or Catalyst B, the resin content was large and the amount of potential total sediment was clearly small compared to the case of using Catalyst a or b. That is, in a product oil obtained using Catalyst A or Catalyst B, a lower amount of sediment was formed and the storage stability was excellent compared to a product oil obtained using Catalyst a or Catalyst b.

From these results, it was found that by using the hydrogenation catalyst using a carrier containing zinc oxide particles having specific properties, without reducing the desulfurization activity of the hydrogenation catalyst, the potential total sediment content in the hydrogenated heavy hydrocarbon oil can be reduced and the storage stability can be enhanced.

INDUSTRIAL APPLICABILITY

According to the hydrogenation catalyst and the hydrogenation method for heavy hydrocarbon oil using the same of the present invention, the storage stability of a hydrogenated heavy hydrocarbon oil can be improved without reducing desulfurization activity or demetallization activity.

The invention claimed is:

1. A hydrogenation catalyst for heavy hydrocarbon oil, wherein at least one of metals in Group 6 of the periodic table is supported on a zinc-containing alumina carrier containing 1% by mass to 15% by mass of zinc oxide particles having an average particle diameter of 2 μm to 12 μm based on the carrier, the average pore diameter is 18 nm to 35 nm, and the specific surface area is 70 m$^2$/g to 150 m$^2$/g.

2. A hydrogenation method for heavy hydrocarbon oil comprising:

conducting a catalytic reaction of heavy hydrocarbon oil in the presence of the hydrogenation catalyst according to claim 1, under the conditions of a temperature of 300° C. to 420° C., a pressure of 3 MPa to 20 MPa, a hydrogen/oil ratio of 400 m$^3$/m$^3$ to 3,000 m$^3$/m$^3$, and a liquid space velocity of 0.1 h$^{-1}$ to 3 h$^{-1}$.

* * * * *